United States Patent [19]

Metcalfe

[11] Patent Number: 5,067,206

[45] Date of Patent: Nov. 26, 1991

[54] FASTENER FOR VEHICLES

[76] Inventor: William M. Metcalfe, 93 Prince Alfred Parade, Newport 2106, NSW, Australia

[21] Appl. No.: 543,219

[22] Filed: Jun. 25, 1990

[51] Int. Cl.$^5$ .............................................. B60R 13/04
[52] U.S. Cl. ......................................... 24/290; 24/293; 24/295; 52/718.1
[58] Field of Search ................ 24/290, 292, 294, 295, 24/297, 293; 52/718.1

[56] References Cited

U.S. PATENT DOCUMENTS

| | | | |
|---|---|---|---|
| 2,168,721 | 8/1939 | Tinnerman | 24/290 |
| 2,268,269 | 12/1941 | Toney et al. | 24/295 |
| 2,959,259 | 11/1960 | Meyer | 24/295 |
| 3,000,066 | 9/1961 | Cochran | 24/290 |
| 3,104,739 | 9/1963 | Munse | 24/290 |
| 3,403,881 | 10/1968 | Bennett et al. | 24/293 |
| 3,631,569 | 1/1972 | Seckerson et al. | 52/718.1 |
| 4,175,303 | 11/1979 | Benedetti | 24/293 |
| 4,656,807 | 4/1987 | Anhegger et al. | 24/290 |

FOREIGN PATENT DOCUMENTS 0595503  4/1960  Canada ................... 24/290

Primary Examiner—Victor N. Sakran
Attorney, Agent, or Firm—Christie, Parker & Hale

[57] ABSTRACT

A fastener attaches to a vehicle body, for example the underside of a hood, to retain a device on the vehicle. The fastener has a bracket with a hook for engaging a first land of the hood, a bar connected to the hook through an elbow for engaging a second land of the hood and a tab at the end of the bar for engaging a third land of the hood. A pin secures the bracket in place using a recess in the hood and the bracket is adapted to wedge into position on the lands to further secure it in place. The device connects to the bracket.

22 Claims, 2 Drawing Sheets

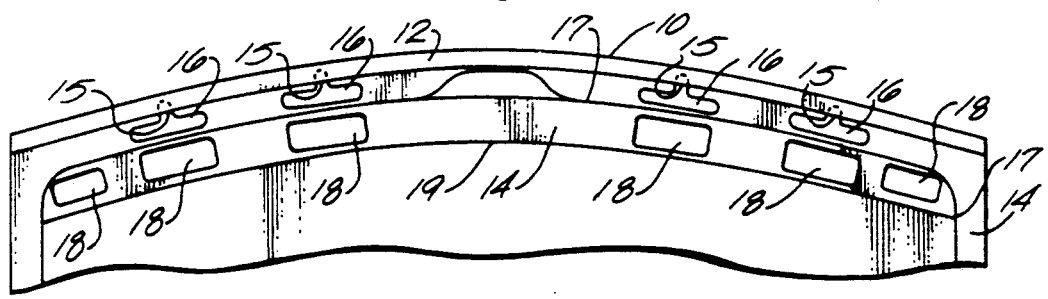

FASTENER FOR VEHICLES

FIELD OF THE INVENTION

The present invention pertains to the field of fasteners and, in particular, to a fastener for attaching a device to the underside of a vehicle hood.

BACKGROUND OF THE INVENTION

There currently exists a significant aftermarket for devices which fasten to the underside of a vehicle hood. These devices include hood protectors, wind deflectors, headlight covers and bug screens. In most cases, these devices are fastened to the vehicle by drilling a hole through the vehicle body and inserting a sheet metal screw or similar fastener through the device and into the hole drilled in the vehicle body. The part of the vehicle body which is typically drilled is the underside of the vehicle hood. The precise locations of the drilled holes depend on the device to be attached and the configuration of the particular vehicle involved.

Some vehicles are manufactured with preexisting holes in interior spaces, for example in the engine compartment or in the vehicle's hood. In some cases, these holes can be used to attach devices to the vehicle by placing a block with a threaded bore on one side of the hole and then placing a screw through the device to be attached, through the hole and then through the threaded bore on the block. A similar effect can be achieved by clipping threaded plates onto or around protruding flat surfaces inside the engine compartment or on the underside of the vehicle's hood.

Drilling is very undesirable in the vehicle accessories aftermarket because it upsets the corrosionresistant coatings of the vehicle and irreversibly changes the vehicle's body panels. In addition, special tools are required to drill holes in a vehicle's body, and these may not always be available to the installer. Threaded clips and blocks eliminate the need to drill holes in the vehicle, however, they can be used only where the vehicle's existing bodywork allows, and they are typically less secure than the drilled holes.

SUMMARY OF THE INVENTION

The present invention allows a device to be fastened to a vehicle body without drilling holes. The fastener holds devices firmly in place without vibration or free play. In one embodiment, the fastener has a hook for engaging a first land on the vehicle body, a tab connected to the hook for engaging a second land and means for attaching the device to the fastener. The tab is preferably adapted to be wedged into an opening between the second land and an opposed upper surface of the body. The tab preferably slides between opposite walls in the upper surface of the body and is substantially restrained from movement towards and away from the groove walls by the groove walls. The fastener preferably includes an elbow between the hook and the tab for engaging a third land of the body and a bar between the hook and the tab adapted to extend over a recess in the body. A pin extendable into the recess retains the fastener in engagement with the first and second lands. Preferably, the bar has a threaded bore and the pin is a screw adapted to be screwed into the bore to engage the recess and, at the same time, retain a device attached to the fastener.

BRIEF DESCRIPTION OF THE DRAWINGS

FIG. 1 is a plan view of the underside of a vehicle hood for which the present invention is particularly suited;

FIG. 2 is a side elevation of a bracket according to the present invention;

FIG. 3 is a plan view of a portion of the hood of FIG. 1 showing a bracket installed thereon;

DETAILED DESCRIPTION OF THE INVENTION

Figure 4:
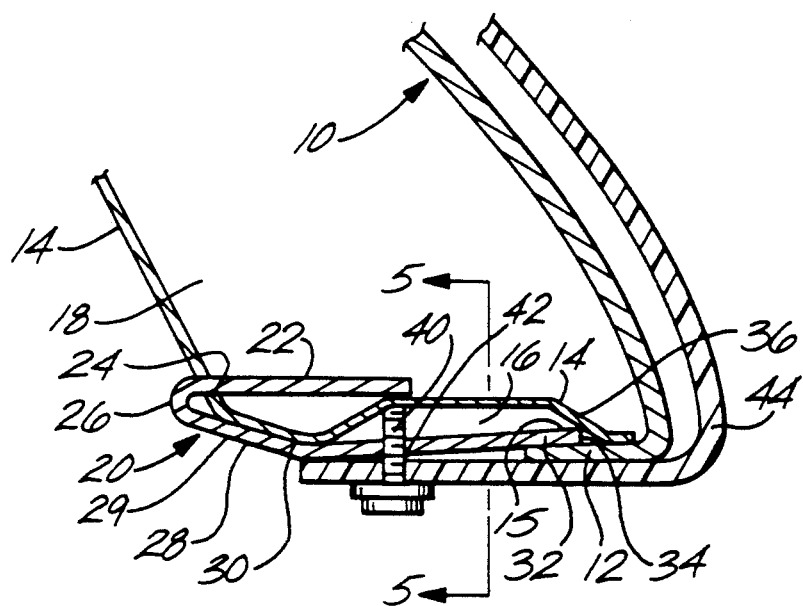
FIG. 4 is a cross-sectional view of the fastener and hood of FIG. 3 taken along line 4—4 of FIG. 3.

The present invention is particularly well suited for use with vehicle hoods which have a particular configuration. This configuration is illustrated in FIG. 1. However, it may also be adapted for a variety of other applications in which the vehicle body to which the device is to be attached shows similar characteristics.

In FIG. 1, the vehicle hood has a first sheet metal surface 10 which forms the exterior surface of the hood (see, e.g., FIG. 4) and folds backwards to form a lip 12 along the leading edge of the front of the vehicle hood. A second metal sheet 14 is welded to the first metal sheet along the leading edge and in other portions as well. The hood may also include lining materials, latches and other devices not shown in FIG. 1. The second sheet 14 includes a variety of folds and bends for enhancing the strength of the second sheet's surface. These include a set of T-shaped grooves 16, the bases of which extend towards the leading edge of the hood under the lip 12 of the first sheet 10. There is an opening 15 between the two metal sheets, where the edges of the groove of the second sheet meet the first sheet. The T-shaped grooves are spaced at even distances from the center of the hood. The second sheet 14 also includes an upward fold 17 leading to a plurality of pockets 18. There is one pocket behind each groove. Each pocket is formed by a cutout in the surface of the second sheet. Since the second sheet is spaced away from the first sheet, there is a space between the two sheets behind the cutout which forms the pocket. After the pocket is another fold 19 required so that the second metal sheet 14 conforms to the shape of the first metal sheet 10.

FIG. 2 shows a bracket 20 which is specifically adapted to take advantage of the physical characteristics of the hood. The bracket is preferably made from a single 1.5 mm thick steel plate, however, a variety of other materials may be used. The bracket 20 is folded to form several different portions. The top portion forms a hook 22. The hook extends rearward towards an elbow 26 which almost reverses the bracket's direction. Following the elbow is a relatively straight bar portion 28. The bar has a rear end 29 near the elbow and then extends forward to end in a tab 32. The bracket is in an approximate reclining J shape. This shape is appropriate for this embodiment because of the hood to which it is mounted. Other shapes may be more appropriate for other applications. The bracket is preferably formed from a single plate for strength, however, it may be formed of separate parts fastened together, if desired. There is a threaded bore 42 in approximately the middle of the bar portion of the bracket. The bore supports a machine screw 40 and washer 41 which are used to hold the bracket in place and to hold the device in place as described below.

The bracket is specifically adapted to engage the hood's groove and the pocket edge shown in FIG. 1. In FIG. 3 the bracket 20 is shown pushed into engagement with the hood. The hook is pushed into the pocket 18 and the tab is pushed into the opening 15 between the two metal sheets formed by the groove 16. As explained in greater detail below, the bracket is designed so that it and the hood are under tension when the bracket is inserted. This tension holds the bracket in place even without the retaining screw 40, although the screw is preferred to maximize stability.

FIG. 4 shows how the bracket cooperates with the features of the hood in greater detail. The bracket's hook portion 22 extends into the pocket to engage a land 24 formed by the bottom outside edge of the pocket. This edge supports the hook 22 and any weight carried by the bracket. The bracket then continues out of the pocket in an elbow 26 which curves around to the relatively straight bar 28. The bar's rear portion 29 contacts a downward facing land 30 formed by the bottom surface of the second sheet. The rear portion of the bar 29 is angled so that the bracket can be wedged against the upward facing pocket edge land 24 and the downward facing bottom surface land 30 to hold the bracket securely in place. In other words, to bring the rear portion of the bar 29 into full contact with the bottom surface land, the bar is bent downwards away from the hook. Because of the steel plate bracket's tensile strength, the spring-like bracket securely grips the two lands when so stressed, securing itself in place.

The bracket's forward tab 32 slides into the opening 15 between the two metal sheets 10 14. The lip 12 of the first sheet 10 forms a land 34 upon which the tab rests within the opening. The sloped end of the groove 16 forms an opposed upper surface 36 which converges toward the lip land 34 narrowing the opening between the land and the upper surface. As the tab is pushed into the opening, it can be wedged between the land and the opposed upper surface until it is held tightly in place. The natural spring tension of the sheet metal holds the bracket tab in place. As the tab is pushed deeper into the opening 15, it pushes the two metal sheets apart. The tension in the metal sheets firmly grips the bracket tab. Preferably, the length of the tab is chosen so that when the hook and the rear part of the bar engage the pocket land and the bottom surface land, the tab simultaneously engages the lip land and the upper surface.

In the hood depicted in the drawings, the groove 16 is elongated and the bar extends along the length of the groove. While a slot having this particular configuration is not necessary to proper operation of the invention, it is presently preferred. The elongated groove allows a pin, in this case a machine screw 40, to be screwed through a bore 42 in the bar to engage a portion of the groove. The groove forms a recess into which the machine screw is driven. The machine screw also allows a device 44 to be fastened to the bracket 20 performing a dual purpose. The two functions of holding the device and securing the bracket could, of course, also be performed using two separate fasteners.

The pin holds the device, in this case a hood protector, attached to the bracket in one or both of two ways. First, it can supply a pressure against the inside or bottom surface of the recess urging the bracket downward. This pressure is opposed by the hook 22 pushing on the pocket land and by the tab pushing on the lip land. The increased pressure on the lands holds the bracket more firmly in place. The resiliency of the steel bracket exerts a constant tension between the screw and the first and second lands securing the bracket in place, engaged against the lands.

The second way the screw secures the bracket is simpler. The bracket is removed from the hood by grasping the elbow and pulling to the left as it is shown in FIG. 4. The pin is located as far away from the opening as possible, yet still within the groove, i.e., as far to the left as possible. The groove has a significant side wall beside the pin. If a force attempted to withdraw the bracket from the opening and withdraw the hook from the pocket, then the pin would be forced against the end of the recess, i.e., the groove side wall, and stopped. Because of the side wall, the bracket cannot be pulled out even if the pin does not contact the bottom surface of the groove.

The pin secures the bracket in still another way. In the illustrated embodiment, the device is a hood protector which connects to the underside of the hood and follows the contour of the leading edge and upper surface of the hood to protect the hood from injury. The hood protector is secured onto the bracket and contacts the lip 12 of the outer metal sheet. When the screw 40 is tightened, the tab is pulled down towards the hood protector further increasing the pressure of the tab on the lip land. The hood protector also presses against the rear end of the bracket's bar. The pressures applied by the device also help secure the bracket against the hood.

Figure 5:
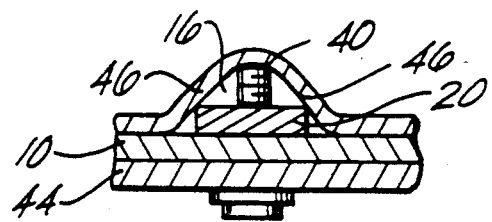
FIG. 5 is a cross-sectional view of FIG. 4 taken along line 5—5.

As shown in FIG. 5, the groove 16 has side walls 46 which angle down towards the outer metal sheet 10. The bracket is narrow enough to slide between the two walls 46, but wide enough that it is substantially restrained from moving toward and away from the groove walls. Preferably the bracket thickness and width is chosen so that the bracket is wedged in place against the groove walls when fully inserted into the opening. Because the bracket precisely fits the dimensions of the openings, slots and lands on the hood, it is held firmly in place even without benefit of the screw. However, the screw ensures that the bracket cannot be removed inadvertently.

The bracket does not require all three lands in order to function properly. However, it is preferred that two lands be provided in order to prevent the bracket from being moved out of place. A variety of other modifications and adaptations of the present invention are possible without departing from the scope of the present invention. While the present description presents only a few embodiments, the inventor intends in no way to abandon other variations and adaptations.

What is claimed is:

1. A fastener for attaching a device to a vehicle body, the body having surfaces which define a recess and which define an oppositely facing land, the fastener comprising:

a bracket having a hook for engaging the land and a bar for extending from the hook over the recess;

a pin for engaging the bar and extending from the bar into the recess to secure the hook in engagement with the land; and means for attaching the device to the fastener.

2. The fastener of claim 1 wherein the body has a surface defining a bottom wall in the recess facing opposite the land, and the pin extends from the bar to the bottom surface urging the bracket away from the recess bottom surface and urging the hook toward the land.

3. The fastener of claim wherein the bar comprises a threaded bore and the pin comprises a screw for screwing into the bore and into the recess to secure the hook.

4. The fastener of claim wherein the bar comprises a threaded bore and the pin and the means for attaching the device to the fastener comprise a screw for attaching the device to the fastener.

5. The fastener of claim wherein the bar comprises a threaded bore and the pin and the means for attaching comprise a screw for screwing into the bore to secure the hook and to attach the device to the fastener.

6. The fastener of claim 1 wherein the body has a surface defining a second land facing substantially the same direction as the first land, and the bracket comprises a tab at the end of the bar opposite the hook for engaging the second land.

7. The fastener of claim 6 wherein the tab is adapted to be wedged into an opening between the second land and an opposed upper surface of the body.

8. The fastener of claim 6 wherein the body has surfaces defining a groove with opposing side walls proximate the second land and wherein the tab is adapted to slide between the opposing groove side walls.

9. The fastener of claim 8 wherein the tab substantially contacts the groove side walls when in contact with the second land so as to be substantially restrained from movement toward and away from the groove walls by the groove walls.

10. The fastener of claim 6 wherein the body has surfaces defining an opposed upper surface to the second land and an opening between the second land and the opposed upper surface and wherein the tab is adapted to be wedged into the opening between the second land and the opposed upper surface.

11. The fastener of claim 6 wherein the pin secures the tab in engagement with the second land.

12. The fastener of claim 1 wherein the body has surfaces defining a third land facing a, direction substantially opposite that of the first land, and wherein the bracket comprises an elbow between the hook and the bar for engaging the third land.

13. The fastener of claim 12 wherein the pin secures the elbow in engagement with the third land.

14. A fastener for attaching a device to a vehicle body, the body having surfaces which define a first and a second upward facing land and an upper surface facing and spaced apart from the second land, the second land and the upper surface defining an opening between them, the fastener comprising:
a bracket having a hook for engaging the first land and a tab extending from the hook for extending into the opening and engaging the second land; and
means for attaching the device to the bracket between the hook and the tab.

15. The fastener of claim 14 wherein the tab is adapted to be wedged into the opening between the second land and the opposed upper surface for securing the bracket against the second land of the body.

16. The fastener of claim 14 wherein the body has surfaces defining a groove with opposing side walls proximate the second land and wherein the tab is adapted to slide between the opposing groove side walls.

17. The fastener of claim 16 wherein the tab substantially contacts the groove side walls when in contact with the second land so as to be substantially restrained from movement towards and away from the groove walls by the groove walls.

18. The fastener of claim 14 wherein the body has a surface defining a third land between the first and second lands and facing in substantially the opposite direction from the first and second lands and wherein the bracket comprises a bar portion between the hook and the tab for engaging the third land.

19. The fastener of claim 18 wherein the bracket is adapted to be resiliently flexed to simultaneously contact the first and third lands, the bracket's resiliency further securing the bracket in engagement with the first and third lands.

20. The fastener of claim 14 wherein the body comprises a recess and the bracket comprises a threaded bore between the hook and the tab and a screw adapted to be screwed into the bore to extend into the recess.

21. The fastener of claim 20 wherein the screw comprises the means for attaching the device to the fastener.

22. A fastener for attaching a device to a vehicle body the vehicle body having surfaces defining first and second spaced apart upward facing lands and a groove between the first and second lands having a surface at its bottom and a contiguous upper surface spaced apart from, facing and extending toward the second land, the upper surface and the second land thereby defining a converging opening, the fastener comprising:
bracket having a hook for engaging the first land, a bar extending from the hook for extending into the groove to be retained therein and a tab for extending into the opening, the tab being adapted to be wedged into the converging opening and retained therein;
a pin for engaging the bar and extending from the bar into the groove to secure the bracket against the first and second lands; and
means for attaching the device to the fastener.

* * * * *

UNITED STATES PATENT AND TRADEMARK OFFICE
CERTIFICATE OF CORRECTION

PATENT NO.  : 5,067,206
DATED       : November 26, 1991
INVENTOR(S) : William M. Metcalfe It is certified that error appears in the above-identified patent and that said Letters Patent is hereby corrected as shown below:

Column 1, line 35, change "corrosionresistant" to
         -- corrosion-resistant --.

Column 3, line 34, change "10 14" to -- 10,14 --.
Column 3, line 35, after "upon" change "Which" to
         -- which --.

In the Claims

Column 5, line 1, after "claim" insert -- 1 --.
Column 5, line 4, after "claim" insert -- 1 --.
Column 5, line 8, after "claim" insert -- 1 --.
Column 5, line 38, after "a" and before "direction" delete
         the comma.
Column 5, line 39, change "first" to -- second --.

Signed and Sealed this

First Day of June, 1993

Attest:

MICHAEL K. KIRK

Attesting Officer    Acting Commissioner of Patents and Trademarks